US008203426B1

(12) United States Patent
Hirschfeld et al.

(10) Patent No.: US 8,203,426 B1

(45) Date of Patent: Jun. 19, 2012

(54) FEED PROTOCOL USED TO REPORT STATUS AND EVENT INFORMATION IN PHYSICAL ACCESS CONTROL SYSTEM

(75) Inventors: Robert A. Hirschfeld, Austin, TX (US); Michael C. Klobe, Austin, TX (US)

(73) Assignee: Precision Edge Access Control, Inc., Lisle, IL (US)

( * ) Notice: Subject to any disclaimer, the term of this patent is extended or adjusted under 35 U.S.C. 154(b) by 1346 days.

(21) Appl. No.: 11/776,356

(22) Filed: Jul. 11, 2007

(51) Int. Cl.

| | |
|---|---|
| ***B60R 25/00*** | (2006.01) |
| ***G06F 11/00*** | (2006.01) |
| ***E05B 65/08*** | (2006.01) |
| ***H04L 9/32*** | (2006.01) |
| ***G06K 5/00*** | (2006.01) |

(52) U.S. Cl. .......... 340/5.7; 340/5.65; 726/27; 235/382; 70/91; 713/168

(58) Field of Classification Search ........................ None
See application file for complete search history.

(56) References Cited

U.S. PATENT DOCUMENTS

| | | | | |
|---|---|---|---|---|
| 5,337,043 | A | 8/1994 | Gokcebay | |
| 5,628,004 | A | 5/1997 | Gormley et al. | |
| 5,774,059 | A | 6/1998 | Henry et al. | |
| 5,878,434 | A | 3/1999 | Draper et al. | |
| 5,903,225 | A | 5/1999 | Schmitt et al. | |
| 5,924,096 | A | 7/1999 | Draper et al. | |
| 5,936,544 | A | 8/1999 | Gonzales et al. | |
| 6,064,316 | A * | 5/2000 | Glick et al. | 340/5.65 |
| 6,496,595 | B1 * | 12/2002 | Puchek et al. | 382/124 |
| 6,547,130 | B1 | 4/2003 | Shen | |
| 6,570,498 | B1 | 5/2003 | Frost et al. | |
| 6,617,970 | B2 | 9/2003 | Makiyama et al. | |
| 6,624,739 | B1 * | 9/2003 | Stobbe | 340/5.2 |
| 6,720,874 | B2 | 4/2004 | Fufido et al. | |
| 6,724,296 | B1 | 4/2004 | Hikita et al. | |
| 6,747,564 | B1 | 6/2004 | Mimura et al. | |
| 6,966,491 | B2 | 11/2005 | Gyger | |
| 6,990,407 | B1 | 1/2006 | Mbekeani et al. | |
| 7,080,402 | B2 | 7/2006 | Bates et al. | |
| 7,096,354 | B2 | 8/2006 | Wheeler et al. | |
| 7,283,050 | B2 | 10/2007 | Minowa | |
| 7,372,839 | B2 | 5/2008 | Relan et al. | |
| 7,375,615 | B2 | 5/2008 | Kitagawa et al. | |
| 7,407,110 | B2 | 8/2008 | Davis et al. | |

(Continued)

FOREIGN PATENT DOCUMENTS

WO WO2005083210 9/2005

*Primary Examiner* — Jennifer Mehmood
*Assistant Examiner* — Fekadeselassie Girma
(74) *Attorney, Agent, or Firm* — Gary Stanford

(57) ABSTRACT

A physical access control system is disclosed which includes a network, at least one access controller, a producer device, and a consumer device. Each access controller generates status and event information associated with a controlled physical barrier. The producer device includes producer logic which collects and stores the status and event information. The consumer device includes consumer logic which periodically polls the producer logic via the network to retrieve the status and event information from the producer device. The producer logic and the consumer logic communicate via the network according to a commonly accepted message syndication protocol, such as the RSS protocol or the Atom Publishing Protocol or the like. The use of a commonly accepted message syndication protocol simplifies communications, avoids proprietary configurations and facilitates integration, such as combining systems or adding new devices and the like.

29 Claims, 8 Drawing Sheets

U.S. PATENT DOCUMENTS

| | | | | |
|---|---|---|---|---|
| 7,468,658 | B2 | 12/2008 | Bouressa | |
| 7,598,842 | B2 * | 10/2009 | Landram et al. | 340/5.73 |
| 7,599,983 | B2 * | 10/2009 | Harper et al. | 709/200 |
| 7,698,566 | B1 | 4/2010 | Stone | |
| 7,817,047 | B1 | 10/2010 | Brignone et al. | |
| 7,818,783 | B2 | 10/2010 | Davis | |
| 2002/0016740 | A1 | 2/2002 | Ogasawara | |
| 2002/0059523 | A1 | 5/2002 | Bacchiaz et al. | |
| 2002/0091745 | A1 | 7/2002 | Ramamurthy et al. | |
| 2002/0094777 | A1 | 7/2002 | Cannon et al. | |
| 2002/0099945 | A1 * | 7/2002 | McLintock et al. | 713/186 |
| 2002/0133725 | A1 | 9/2002 | Roy et al. | |
| 2002/0137524 | A1 | 9/2002 | Bade et al. | |
| 2003/0004737 | A1 | 1/2003 | Conquest et al. | |
| 2003/0023882 | A1 | 1/2003 | Udom | |
| 2003/0046260 | A1 | 3/2003 | Satyanarayanan et al. | |
| 2003/0056096 | A1 | 3/2003 | Albert et al. | |
| 2003/0085914 | A1 | 5/2003 | Takaoka et al. | |
| 2003/0093690 | A1 | 5/2003 | Kemper | |
| 2003/0179073 | A1 | 9/2003 | Ghazarian | |
| 2003/0182194 | A1 | 9/2003 | Choey et al. | |
| 2003/0217122 | A1 | 11/2003 | Roese et al. | |
| 2003/0218533 | A1 | 11/2003 | Flick | |
| 2003/0233278 | A1 | 12/2003 | Marshall | |
| 2004/0017929 | A1 | 1/2004 | Bramblet et al. | |
| 2004/0036574 | A1 | 2/2004 | Bostrom | |
| 2004/0049675 | A1 | 3/2004 | Micali et al. | |
| 2004/0067773 | A1 | 4/2004 | Rachabathuni et al. | |
| 2004/0140899 | A1 | 7/2004 | Bouressa | |
| 2004/0153671 | A1 | 8/2004 | Schuyler et al. | |
| 2004/0203633 | A1 | 10/2004 | Knauerhase et al. | |
| 2004/0261478 | A1 | 12/2004 | Conforti | |
| 2005/0038791 | A1 * | 2/2005 | Ven | 707/100 |
| 2005/0061883 | A1 | 3/2005 | Miller et al. | |
| 2005/0171787 | A1 | 8/2005 | Zagami | |
| 2005/0241003 | A1 | 10/2005 | Sweeney et al. | |
| 2005/0255840 | A1 | 11/2005 | Markham | |
| 2005/0259606 | A1 | 11/2005 | Shutter et al. | |
| 2005/0274793 | A1 | 12/2005 | Cantini et al. | |
| 2005/0284931 | A1 | 12/2005 | Adams et al. | |
| 2006/0013234 | A1 | 1/2006 | Thomas et al. | |
| 2006/0022794 | A1 | 2/2006 | Determan et al. | |
| 2006/0048233 | A1 | 3/2006 | Buttross et al. | |
| 2006/0055510 | A1 | 3/2006 | Little et al. | |
| 2006/0059099 | A1 | 3/2006 | Ronning et al. | |
| 2006/0059557 | A1 | 3/2006 | Markham et al. | |
| 2006/0059963 | A1 | 3/2006 | Conforti | |
| 2006/0075492 | A1 | 4/2006 | Golan et al. | |
| 2006/0076420 | A1 | 4/2006 | Prevost et al. | |
| 2006/0106944 | A1 | 5/2006 | Shahine et al. | |
| 2006/0112423 | A1 | 5/2006 | Villadiego et al. | |
| 2006/0119469 | A1 | 6/2006 | Hirai et al. | |
| 2006/0136742 | A1 | 6/2006 | Giobbi | |
| 2006/0230019 | A1 | 10/2006 | Hill et al. | |
| 2006/0255129 | A1 | 11/2006 | Griffiths | |
| 2007/0046424 | A1 | 3/2007 | Davis et al. | |
| 2007/0046468 | A1 | 3/2007 | Davis | |
| 2007/0055731 | A1 * | 3/2007 | Thibeault | 709/204 |
| 2007/0088807 | A1 * | 4/2007 | Moore | 709/217 |
| 2007/0106754 | A1 * | 5/2007 | Moore | 709/217 |
| 2007/0186106 | A1 | 8/2007 | Ting et al. | |
| 2007/0250920 | A1 | 10/2007 | Lindsay | |
| 2008/0091944 | A1 | 4/2008 | von Mueller et al. | |
| 2008/0109098 | A1 | 5/2008 | Moshier et al. | |
| 2008/0129467 | A1 | 6/2008 | Gennard | |
| 2008/0189214 | A1 | 8/2008 | Mueller et al. | |
| 2008/0209506 | A1 * | 8/2008 | Ghai et al. | 726/1 |
| 2008/0263640 | A1 | 10/2008 | Brown | |
| 2008/0277486 | A1 | 11/2008 | Seem et al. | |
| 2009/0050697 | A1 | 2/2009 | Sparks et al. | |
| 2009/0064744 | A1 | 3/2009 | Wang | |
| 2010/0023865 | A1 * | 1/2010 | Fulker et al. | 715/734 |
| 2010/0188509 | A1 | 7/2010 | Huh | |
| 2011/0006879 | A1 | 1/2011 | Lambrou et al. | |

* cited by examiner

1200

600

| Name | Descriptions | Default |
|---|---|---|
| max-results | Maximum number of results to return | 50 |
| event-window | Number of hours old an event can be and still meet the criteria | 24 |
| ignored-events | Event types that will not be included in the results | |
| alt | The type of feed that should be generated. Possible values are: atom-0.3, rss-2.0, rss-1.0, atom-1.0 | atom-0.3 |

```xml
<?xml version="1.0" encoding="UTF-8"?>
<feed xmlns="http://purl.org/atom/ns#" xmlns:rdf="http://www.w3.org/1999/02/22-rdf-syntax-ns#" xmlns:sy="http://purl.org/rss/1.0/modules/
syndication/" xmlns:dc="http://purl.org/dc/elements/1.1/" xmlns:access="http://novusedge.com/module/accessevent/1.0" xmlns:taxo="http://
purl.org/rss/1.0/modules/taxonomy/" version="0.3">
 <title>Access Event Feed</title>
 <link rel="alternate" href="https://192.168.210.177:443/feeds/events/events" />
 <tagline>Summary of Access Events</tagline>
 <modified>2007-05-23T20:12:04Z</modified>
 <dc:date>2007-05-23T20:12:04Z</dc:date>
 <entry>
  <title>Door Tamper</title>
  <link rel="alternate" href="https://192.168.210.177:443/ews/event/7" />
  <author>
   <name />
  </author>
  <modified>2007-05-23T20:12:04Z</modified>
  <issued>2007-05-23T20:12:04Z</issued>
  <summary type="text/plain" mode="escaped">Door Tamper "Door 1", "New Controller" (192.168.210.63)</summary>
  <dc:date>2007-05-23T20:12:04Z</dc:date>
  <access:eventtype>Door Tamper</access:eventtype>
  <access:eventtypeid>50</access:eventtypeid>
  <access:timestamp>1179951124000</access:timestamp>
  <access:ip>192.168.210.63</access:ip>
  <access:eventcategory>Alert</access:eventcategory>
 </entry>
 <entry>
  <title>Door Tamper Clear</title>
  <link rel="alternate" href="https://192.168.210.177:443/ews/event/6" />
  <author>
   <name />
  </author>
  <modified>2007-05-23T20:12:04Z</modified>
  <issued>2007-05-23T20:12:04Z</issued>
  <summary type="text/plain" mode="escaped">Door Tamper Clear "Door 1", "New Controller" (192.168.210.63)</summary>
  <dc:date>2007-05-23T20:12:04Z</dc:date>
  <access:eventtype>Door Tamper Clear</access:eventtype>
  <access:eventtypeid>51</access:eventtypeid>
  <access:timestamp>1179951124000</access:timestamp>
  <access:ip>192.168.210.63</access:ip>
  <access:eventcategory>Alert</access:eventcategory>
 </entry>
 <entry>
  <title>Controller Online</title>
  <link rel="alternate" href="https://192.168.210.177:443/ews/event/5" />
  <author>
   <name />
  </author>
  <modified>2007-05-23T14:24:12Z</modified>
  <issued>2007-05-23T14:24:12Z</issued>
  <summary type="text/plain" mode="escaped">Controller Online 192.168.210.63 "New Controller" (192.168.210.63)</summary>
  <dc:date>2007-05-23T14:24:12Z</dc:date>
  <access:eventtype>Controller Online</access:eventtype>
  <access:eventtypeid>3</access:eventtypeid>
  <access:timestamp>1179930252343</access:timestamp>
  <access:ip>192.168.210.63</access:ip>
  <access:eventcategory>Infrastructure</access:eventcategory>
 </entry>
</feed>
```

700

FIG. 7

FEED PROTOCOL USED TO REPORT STATUS AND EVENT INFORMATION IN PHYSICAL ACCESS CONTROL SYSTEM

BACKGROUND OF THE INVENTION

1. Field of the Invention

The present invention relates to access control systems, and more particularly to a feed protocol used to report status and event information in a physical access control system.

2. Description of the Related Art

A physical access control system includes one or more access controllers which are used to restrict access to one or more physical locations by controlling physical barriers, such as doors, turnstiles, elevators, gates, etc. A physical access control system is distinguished from logical access control systems, such as used to restrict access to data or information on a computer system or the like. A physical access control system may further include local controllers and servers for managing message communications, where such messages include event information, status information, alarm information, etc. Conventional physical access control systems used a proprietary or specialized event reporting communication application or messaging service since there was no standard format or syntax for alarm or event reporting. Management technologies, therefore, have been tied directly to the event source since the message format had to be decided upon beforehand to ensure conformance with the syntax. The relationship with the reporter, or producer, and the receiver, or consumer, had to be tightly coupled because it was based on push technology in which the producer asynchronously transmitted the data to the consumer. The tight coupling had to be established before any messages could be sent. The specialized and proprietary nature of conventional physical access control systems along with requisite tight coupling between information producers and consumers made integration very difficult. Integration concerns expanding an existing system such as adding additional controllers or servers or management consoles or the like.

It is desired to provide a messaging service in an access control system that facilitates integration.

BRIEF DESCRIPTION OF THE DRAWINGS

The benefits, features, and advantages of the present invention will become better understood with regard to the following description, and accompanying drawings where:

FIG. 7 is a sample RSS XML document including general RSS information and custom access categories for access control specific content;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
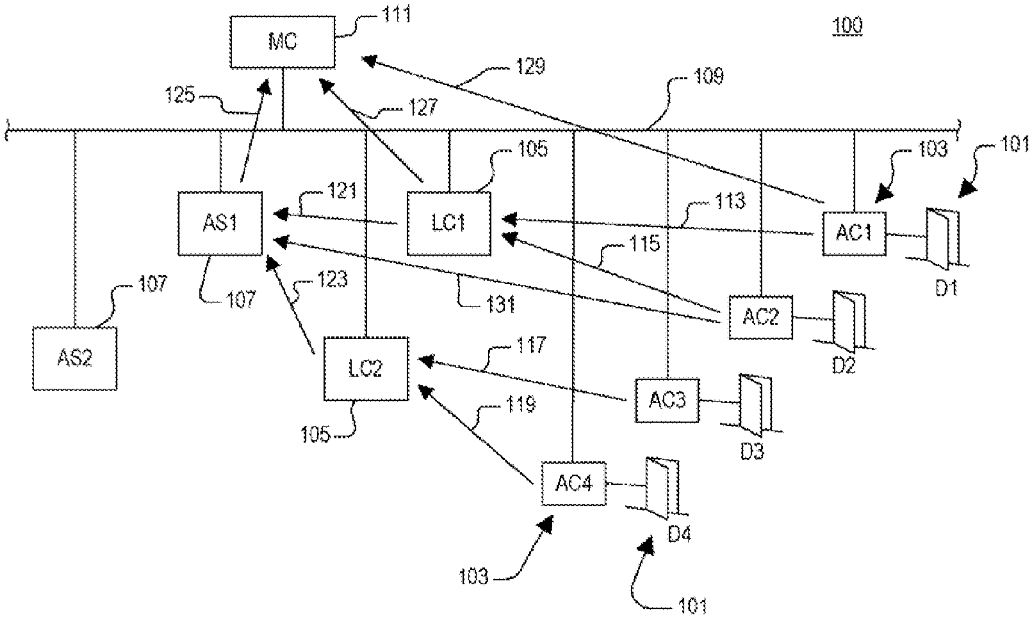
FIG. 1 is a block diagram of a physical access control system implemented according to an exemplary embodiment.

FIG. 1 is a block diagram of a physical access control system 100 implemented according to an exemplary embodiment. Several doors 101 are shown, individually shown as D1, D2, D3, and D4, for controlling access to corresponding restricted physical areas. Although only doors are shown, each door represents any type of controlled physical barrier employed by physical access control systems, such as doors, turnstiles, elevators, gates, etc. Also, although only four doors (or physical barriers) are shown, any number of physical barriers (e.g., more or less than four) may be included depending upon the particular areas and restriction rules. Access controllers (AC) 103, shown individually as AC1, AC2, AC3, and AC4, are provided for controlling the doors D1-D4, respectively. Each access controller 103 is configured in any suitable manner for controlling access to a restricted area, such as an access device (not shown) and a reader device (not shown). A reader device is configured to read or otherwise detect tokens provided by a user (or possibly by a robot or other automated machine), such as a keypad, magnetic card reader, biometric scanner (e.g., fingerprint, retinal, etc.), etc. Tokens may have any form as known to those skilled in the art, such as pin codes, data keys from access cards, biometric patterns, etc. An access device is a mechanism enforcing restricted access and thus preventing unauthorized access. The access device is configured for the particular type of access system, such as a strike unit for a door 101 or the like. If the appropriate token is provided to a reader device at an appropriate time, the reader device controls the access device to provide entrance to a corresponding restricted area.

The physical access control system 100 further includes several local controllers (LC) 105, individually shown as LC1 and LC2, for controlling selected ones of the access controllers 103. Each local controller 105 is configured to make access decisions, such as including processor logic (not shown) and memory (not shown). The memory of the local controller 105, for example, stores a local cache of tokens or the like. In one embodiment, each local controller 105 operates to receive a token via a reader device of a corresponding access device 103, compares the received token with the tokens in its local token cache to make an access decision, and grants or denies access depending upon the decision result. If the received token matches a stored token, then access is granted and the local controller 105 controls the corresponding access device to grant access based on the access decision. If the token is not found, then access is denied.

Each token at any given local controller 105 may be authorized for selected times or according to predetermine rules. In one embodiment, for example, a scenarios database or the like incorporates access rules, scheduling information, operational modes, etc., for maintaining the access information for each local controller 105. A given token may have few, if any, limitations, meaning that it allows access to all areas at all times. Other tokens may have certain qualifications or limitations, such as allowing access only to selected areas, or allowing access only for selected times, or allowing access only for certain dates, or any combination of these limitations. Such qualifications are associated with scenarios, which describe general operational modes for each local controller 105, including rules applied to each token. The scenarios encompass various operational modes, such as emergency situations or scheduled events or time periods. In general, the scenarios determine which tokens are authorized for which areas for which times and for which situations or conditions. Each token may further include flags or the like for turning on and off authorization or modifying access rules or scenarios or access conditions associated with that token. For example, selected tokens may be enabled or disabled during certain times or dates, such as daytime/nighttime or weekday/weekend, etc. It is appreciated by those skilled in the art that any number of flags may be defined for each token.

In the illustrated embodiment, the physical access control system 100 includes one or more local controllers 105, each associated with or otherwise controlled by at least one access server (AC) 107. Although only two access servers 107 are shown, individually labeled AS1 and AS2, it is understood that the physical access control system 100 may include any number of access servers depending upon the particular configuration. The access controllers 103, the local controllers 105 and the access servers 109 are all coupled to a network 109. A management console (MC) 111 is also provided and coupled to the network 109. Each access controller 103 monitors and collects status and event information for a corresponding one of the doors 101. In one embodiment, the status and event information includes any type of relevant information suitable for the particular implementation of the physical access control system 100, such as access controller status (e.g., door open, door closed, door locked, door unlocked, etc.), local controller status (e.g., controller online/offline, access allowed events, access denied events, etc.), various types of alarms (e.g., door forced, door held, device tamper, etc.), etc.

The network 109 may incorporate any wired or wireless communication configuration or any combination thereof. Each of the access controllers 101, the local controllers 105, the access servers 107, the management console 111, etc., may be coupled to the network 109 using wired or wireless communications or the like. The network 109 is typically a relatively high bandwidth and/or high reliability network. The physical access control system 100 may be implemented as a closed system and/or otherwise a secure system. The network 109, for example, may be isolated from other networks to maintain a high level of security. In alternative embodiments, the network 109 includes less secure portions and may even be coupled to one or more public or larger networks, such as the public switched telephone network (PSTN) and/or the Internet and the like. As an example, the management console 111 may be externally coupled via the Internet for retrieving status and event information of selected access servers 107 within the physical access control system 100. In various embodiments, such as those including limited security or non-secure networks, secure communications between the controllers, servers, consoles, etc., may be facilitated using encrypted communication methods or channels. The network 109 is configured to enable communications according to any suitable type of communication protocol, such as, for example, the Hypertext Transfer Protocol (HTTP) or the like. A secure HTTP connection (e.g., HTTPS) or the like may be employed to provide a suitable level of authentication and encryption to prevent unauthorized access or control of the system.

The management console 111 monitors status and events and manages operations of selected devices, controllers, access servers, etc., within the physical access control system 100. As shown, the access controller AC1 collects status and event information of the door D1 and reports the collected information to the local controller LC1 via the network 109 as indicated by arrow 113. In a similar manner, the access controller AC2 collects status and event information of the door D2 and reports the collected information to the local controller LC1 via the network 109 as indicated by arrow 115. Furthermore, the access controllers AC3 and AC4 collect status and event information of the doors D3 and D4, respectively, and report this information to the local controller LC2 as indicated by arrows 117 and 119, respectively. In this manner, the local controller LC1 collects aggregated status and event information about doors D1 and D2 and the local controller LC2 collects aggregated status and event information about doors D3 and D4. The local controllers LC1 and LC2 further report aggregated status and event information to the access server AS1 via the network 109 as illustrated by arrows 121 and 123, respectively. The access server AS1 reports aggregated status and event information to the management console 111 via the network 109 as indicated by the arrow 125. The access server AS2 may collect similar status and event information from either one or both of the local controllers 105 or other local controllers (not shown) and report this information to the management console 111.

In conventional configurations, management consoles were essentially coupled to the network at "fixed" or predetermined known locations using point to point communications and the like. A proprietary, closed and relatively static event-driven protocol was used to enable communication between a fixed management console and selected access servers. Information communicated by an access server was interrupt-driven and communicated to particular management console(s) in an asynchronous manner, such as via a targeted communication or the like. In such a static and proprietary system, the conventional management console had to be connected and operational to receive and record the event communications, or otherwise receive a "dump" of queued event communications when brought online. The proprietary communication protocol of the conventional management console had to be specifically configured to receive and manage communications.

As described further below, each of the devices of the physical access control system 100 communicate via the network 109 employing a standardized and easily configurable message syntax that enables other devices to subscribe and unsubscribe to other devices at any time. As shown, for example, the management console 111 may directly receive the status and event information collected by the local controller LC1 via the network 109 as illustrated by arrow 127. The management console 111 may subscribe to receive the status and event information from any other local controller in the system in similar manner. Also, the management console 111 may also directly receive the status and event information detected by the access controller AC1 via the network 109 as illustrated by arrow 129. The management console 111 may subscribe to receive the status and event information from any other access controller in the system in similar manner. Furthermore, the access server AS1 may directly receive the status and event information of the access controller AC1 via the network 109 as illustrated by arrow 131, thereby bypassing the local controller LC1. The access server AS1 (or any other access server) may subscribe to receive the status and event information from any other access controller in the system in similar manner.

Figure 2:
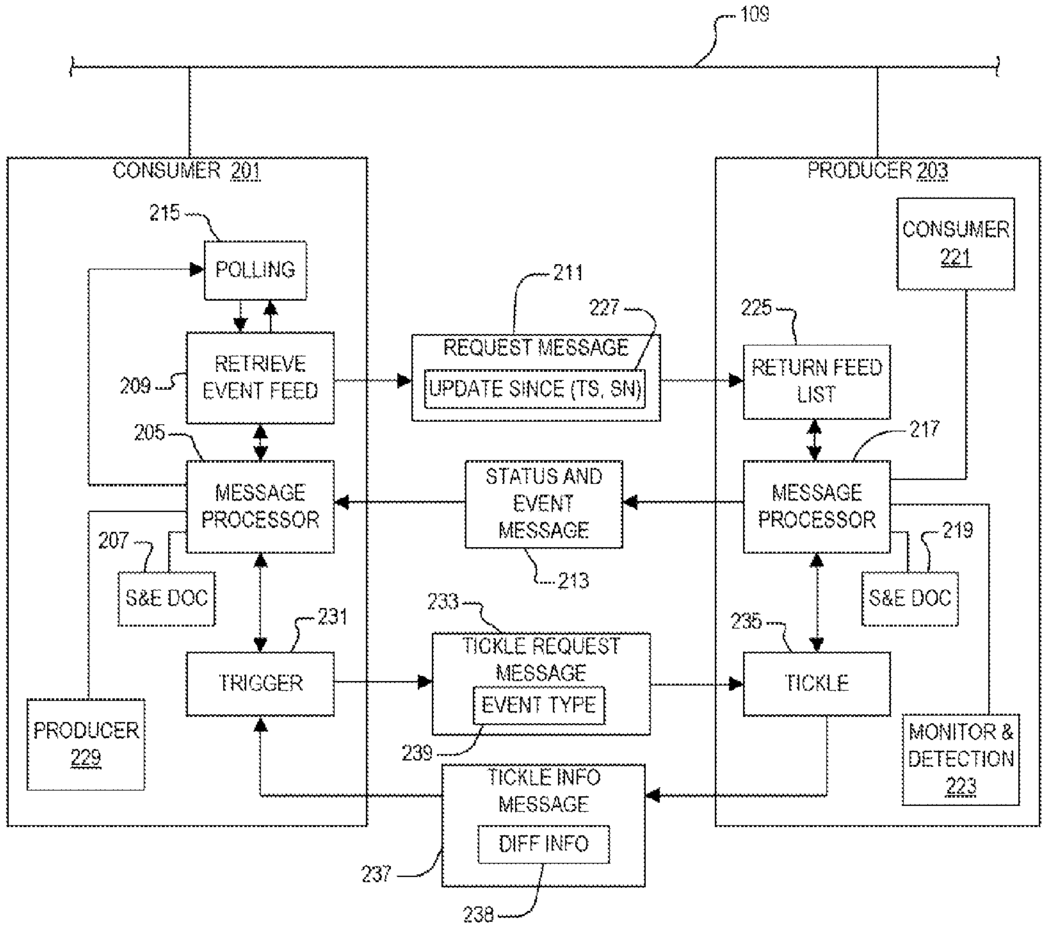
FIG. 2 is a simplified block diagram illustrating configuration and operations of consumer logic and producer logic according to an exemplary embodiment.

FIG. 2 is a simplified block diagram illustrating configuration and operations of consumer logic 201 and producer logic 203 according to an exemplary embodiment. As described further below, the consumer logic 201 and the producer logic 203 are provided within the controllers, servers and consoles of the physical access control system to monitor and detect status and event information and to report this information to a requesting device. The term "logic" as used herein denotes any combination of electronic circuitry, semiconductor devices and/or programming code (software, firmware, programs, etc.) as understood by those skilled in the art. The consumer logic 201 and the producer logic 203 communicate with each other via the network 109. The consumer logic 201 requests status and event information from one or more producer devices and filters and aggregates the received information. The producer logic 203 detects, collects or otherwise aggregates status and event information and sends the information via the network 109 to the consumer logic 201 upon request.

In one embodiment, the consumer logic 201 is included within any device of the physical access control system 100 for requesting information from other producer devices, such as within the local controllers 105, the access servers 107, and the management console 111. The consumer logic 201 may be included within any one of the access controllers 103 in the event it is desired to transfer status and event information from one access controller to another. In one embodiment, the producer logic 203 is included within any device of the physical access control system 100 for providing information in response to requests from other devices, such as within the access controllers 103, the local controllers 105, the access servers 107, and the management console 111. The management console 111 includes the producer logic 203 if it is desired to send information from to another management console (not shown) or to transmit information to other management devices (not shown). It is appreciated that any given device within the physical access control system 100 may include both the consumer logic 201 and the producer logic 203.

The consumer logic 201 includes a message processor 205 which further incorporates or otherwise interfaces a list of aggregated status and events, shown as a status and event document (S&E DOC) 207. The status and event information aggregated into the status and event document 207 may come from any one or more of a variety of sources depending upon which device incorporates the consumer logic 201 and from which devices it requests the information. The message processor 205 interfaces retrieve event feed logic 209 which generates a request message 211 and sends the request message 211 to the producer logic 203 via the network 109. The producer logic 203 responds with a status and event message 213 via the network 109 containing requested information. The status and event message 213 is provided to the message processor 205, which incorporates any new information contained within the message 213 into the status and event document 207.

In one embodiment, the consumer logic 201 includes polling logic 215 coupled to the message processor 205 and the retrieve event feed logic 209. The message processor 205 programs the polling logic 215 according to a predetermined time period or according to predetermined conditions or criterion, and the polling logic 215 times out and interrupts or otherwise communicates to the retrieve event feed logic 209. In response to a polling interrupt or communication from the polling logic 215, the retrieve event feed logic 209 generates and sends another message 211 to the producer logic 203. In one embodiment, the polling logic 215 includes a timer or the like which generates an interrupt upon expiration of each time period (e.g., every millisecond, every second, every minute, etc.). In another embodiment, the polling logic 215 incorporates more sophisticated logic for polling based on selected time periods and/or other events or dates or information or criterion. As an example, the polling logic 215 may be programmed to adjust the frequency of polling of certain producer devices during certain time of day or during certain days of the week, etc.

The producer logic 203 includes a message processor 217, which further incorporates or otherwise interfaces a list of aggregated status and events, shown as a status and event document 219. In one embodiment, the producer logic 203, or the device incorporating the producer logic 203, further includes consumer logic 221 configured in substantially the same manner as the consumer logic 201 for requesting status and event information from other devices in the physical access control system 100. For example, in one embodiment the local controller LC1 includes the consumer logic 221 (which may be configured in similar manner as the consumer logic 201) to request and collect status and event information from the access controllers AC1 and AC2, and further includes the producer logic 203 to provide the aggregated information to a requesting consumer device, such as the access server AS1 and/or the management console 111. It is noted that any device incorporating both the consumer logic 201 and the producer logic 203 may have a single message processor (e.g., message processors 205 and 217 are combined as a single processor) which manages a single status and event document (e.g., status and event documents 207 and 219 are combined as a single document). As shown, the consumer logic 201, or the device incorporating the consumer logic 201, may also include producer logic 229 coupled to the message processor 205. The producer logic 229 may be configured in substantially the same or similar manner as the producer logic 203, and may further employ the same message processor 205 of the consumer logic 201 rather than a separate message processor.

In one embodiment, the producer logic 203, or the device incorporating the producer logic 203, includes monitoring and detection logic 223 for monitoring status and detecting events associated with a corresponding one of the doors 101 or the like. Each access controller 103, for example, may include the monitoring and detection logic 223 for detecting the status and event information from at least one source (e.g., door 101 or the like) within the physical access control system 100. The status and event information from either one or both of the consumer logic 221 and the monitoring and detection logic 223 is provided to and collected by the message processor 217 and stored within the status and event document 219.

The producer logic 203 further includes return feed list logic 225 interfaced with the message processor 205 for responding to request messages 211 sent from the consumer logic 201 via the network 109. The return feed list logic 225 examines or otherwise parses the request message 211 and communicates with the message processor 217 to generate the corresponding status and event message 213, which is sent back to the consumer logic 201 in response to the request message 211. The message processor 217 gathers the status and event information within the status and event document 219 according to the request message 211 into the status and event information message 213 and then sends the message 213 back to the consumer logic 201. In certain embodiments, the request message 211 is configured as a simple request indication such that the producer logic 203 responds by incorporating substantially all of the information from the status and event document 219 into the status and event message 213. The message processor 205 is configured to filter out and discard redundant or obsolete status and event information and incorporate only new or updated information into the status and event document 207. In various embodiments, the message processor 217 is also configured according to predetermined rules or the like to filter out or otherwise remove obsolete information.

In other embodiments, the request message 211 incorporates one or more arguments or values or parameters or switches or the like to identify particular information requested or to otherwise limit the amount of information incorporated within the status and event message 213. In the illustrated embodiment, for example, each entry of the status and event documents 219 and 207 include a temporal value, such as a timestamp (TS) or a sequence number (SN) or the like indicative of when or in which order the status indication or event occurred. In this embodiment, the request message 211 may include an UPDATE SINCE value 227 including one or more temporal parameters, such as a timestamp and/or a sequence number or the like. The return feed list logic 225 detects whether the UPDATE SINCE value 227 is set, and if so, retrieves the temporal parameter(s) associated with the UPDATE SINCE value 227 and instructs the message processor 217 to include only the information after the SN or subsequent to the TS within the status and event message 213. In this manner, the UPDATE SINCE value 227 of the request message 211 may be used to limit the amount of data transmitted on the network 109, such as to new or updated information.

For example, the retrieve event feed logic 209 may send an initial request message 211 as a simple request or with the UPDATE SINCE value 227 not set or otherwise cleared to retrieve all of the status and event information contained within the status and event document 219. The message processor 205 receives and provides the last TS or SN of the last status and event message 213 to the retrieve event feed logic 209. Subsequently, when the retrieve event feed logic 209 sends another request message 211, such as, for example, in response to an interrupt from the polling logic 215, the retrieve event feed logic 209 sets the UPDATE SINCE value 227 and incorporates the last provided TS or SN. The return event feed logic 225 detects the UPDATE SINCE value 227 and provides the TS or SN to the message processor 217, which incorporates only updated status and event information into the status and event message 213 as of the TS or SN. The retrieve event feed logic 209 may continue to use the UPDATE SINCE value 227 in subsequent requests so that only updated information is provided in subsequent status and event messages. In this manner, the consumer logic 201 remains updated while minimizing information transmitted on the network 109.

The polling method employed between the consumer logic 201 and the producer logic 203 provides significant benefits over interrupt methods employed by conventional physical access control systems. Rather than having to wait for one or more producers to send new information, a consumer device simply polls one or more applicable producer devices for all available status and event information. For example, the local controller LC1 polls the access controllers AC1 and AC2 for any stored status and event information. The consumer device then polls each of the applicable producer devices on a periodic basis to retrieve only updated information since the last poll. It may be desired, however, that certain events, such as alarms or the like, be sent immediately rather than waiting for the next poll event. In one embodiment, the consumer logic 201 further includes trigger logic 231 coupled to the message processor 205. The message processor 205 instructs the trigger logic 231 to send a tickle request message 233 to the producer logic 203, which includes tickle logic 235 responsive to each tickle request message 233. The tickle logic 235 monitors the message processor 217 for any new events according to the tickle request message 233. At any time the tickle logic 235 detects new events as indicated by the tickle request message 233, it sends a tickle information message 237 to the trigger logic 231 with aggregate information regarding the new events. In one embodiment, the aggregate information within the tickle information message 237 is not the status or event information itself but instead includes differential information 238, such as the number of new events meeting the parameters of the corresponding tickle request message 233, the time(s) the new events were added, etc. When the trigger logic 231 receives the tickle information message 237, it instructs the retrieve event feed logic 215 to send an immediate request message 211 to the producer logic 203 to retrieve the new information. In one embodiment, the retrieve event feed logic 209 further resets the polling logic 215.

In one embodiment, the tickle request message 233 may be a relatively simple message which requests that the tickle logic 235 respond when any new status or event information is available by the message processor 217. It is appreciated, however, that much of the new information is either status or low priority event information such that the polling process may be sufficient. In another embodiment, the tickle request message 233 includes at least one event type value 239 which specifies any subset of the types of new events that may occur. For example, in one embodiment the event type value 239 specifies alarms or certain types of alarms or any other types of high priority events, so that the tickle logic 235 sends the tickle information message 237 only for those events indicated by the event type value 239. In response to the new event, the retrieve event feed logic 209 sends an 'asynchronous' request message 211 to request an immediate update including the new event(s). In this manner, the polling method including the UPDATE SINCE value 227 along with the tickle method including the event type value 239 ensures that the consumer logic 201 remains up-to-date and is further informed immediately of predetermined and selected events (e.g., high priority events), such as alarms and the like. In one embodiment, the tickle logic 235 is configurable to respond only in the event of new information, to respond after a predetermined period of time regardless of whether any new information is available, or to respond after a configurable time period regardless of whether any new information is available, or any combination of these methods.

Figure 3:
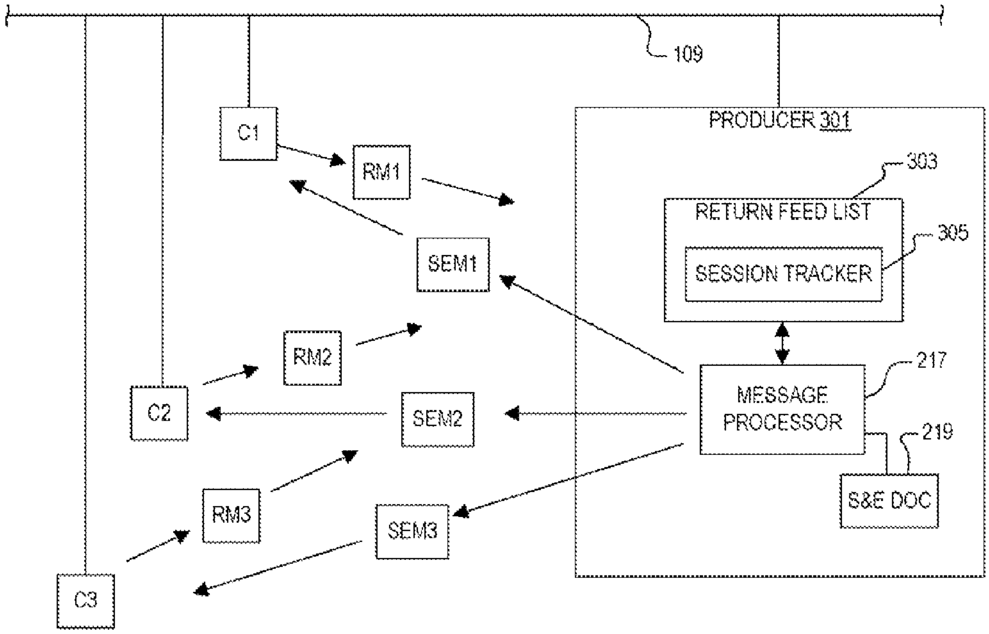
FIG. 3 is a simplified block diagram of a portion of producer logic implemented according to another exemplary embodiment for tracking state information.

FIG. 3 is a simplified block diagram of a portion of producer logic 301 implemented according to another exemplary embodiment for tracking state information. The producer logic 301 is configured substantially similar to the producer logic 203 and only a portion of the producer logic 301 is shown. The return feed list logic 225 of the producer logic 203 is configured to operate with the general assumption that the consumer logic 201 is configured to track state information. The return feed list logic 225 is replaced with return feed list logic 303, which further includes session tracker logic 305. The return feed list logic 303 is coupled to the message processor 217 with the status and event document 219, where the message processor 217 and the status and event document 219 operate in substantially the same manner as previously described. As shown, several different consumer devices C1, C2 and C3 send corresponding request messages RM1, RM2 and RM3, respectively, to the producer logic 301 via the network 109. In one embodiment, each of the consumer devices C1-C3 include consumer logic substantially similar to the consumer logic 201. The return feed list logic 303 receives each of the requests and interfaces the message processor 217 to provide the appropriate response. The message processor 217 operates in a substantially similar manner as previously described for providing corresponding status and event messages SEM1, SEM2 and SEM3 to the consumer devices C1, C2 and C3, respectively. The return feed list logic 303 operates in a similar manner as the return feed list logic 225 previously described, except as modified by the session tracker logic 305. As described further below, the session tracker logic 305 tracks each session and thus each consumer device making requests and adjusts or modifies the response by the message processor 217 accordingly.

Figure 4:
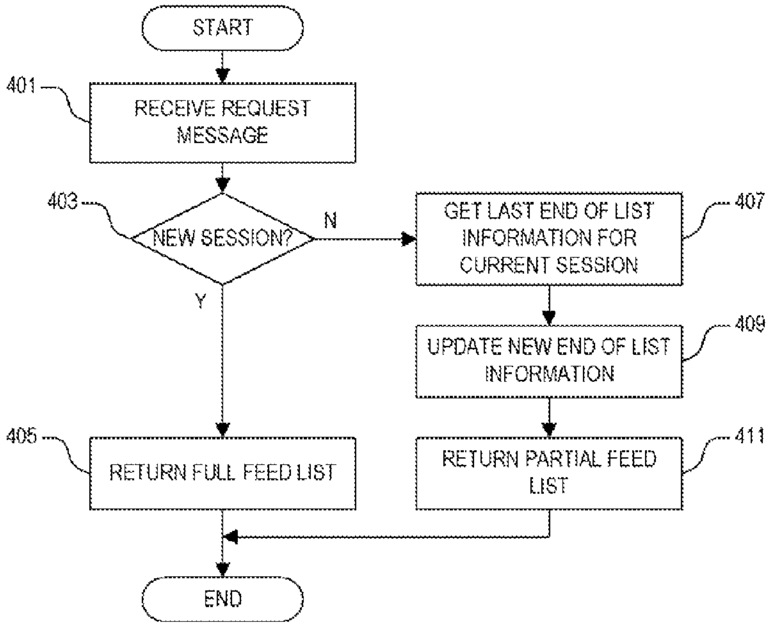
FIG. 4 is a flowchart diagram illustrating operation of the return feed list logic of FIG. 3 including the session tracker logic according to an exemplary embodiment.

FIG. 4 is a flowchart diagram illustrating operation of the return feed list logic 303 including the session tracker logic 305 according to an exemplary embodiment. At first block 401, a new status and event message is received, such as any of the messages RM1, RM2 and RM3. At next block 403, the return feed list logic 303 consults the session tracker logic 305 to determine whether the new message is from another device and therefore a new session. If so, operation proceeds to block 405 in which the return feed list logic 303 instructs the message processor 217 to return a full feed list including the entire contents of the status and event document 219 and operation is completed. If instead at block 403 it is determined that the session is not new such that the requesting consumer device has already received the full list, operation proceeds instead to block 407 in which the return feed list logic 303 retrieves the last end of list information for the current session for the current consumer device from the session tracker logic 305. At next block 409, the session tracker logic 305 updates the new end of list information for the current consumer device. At next block 411, the return feed list logic 303 instructs the message processor 217 to return a partial feed list representing updated information relative to previous information sent to the same consumer device, and operation is completed. In this manner, the consumer logic of the consumer devices C1-C3 may be simplified and need only send simple request messages to retrieve updated information.

Figure 5:
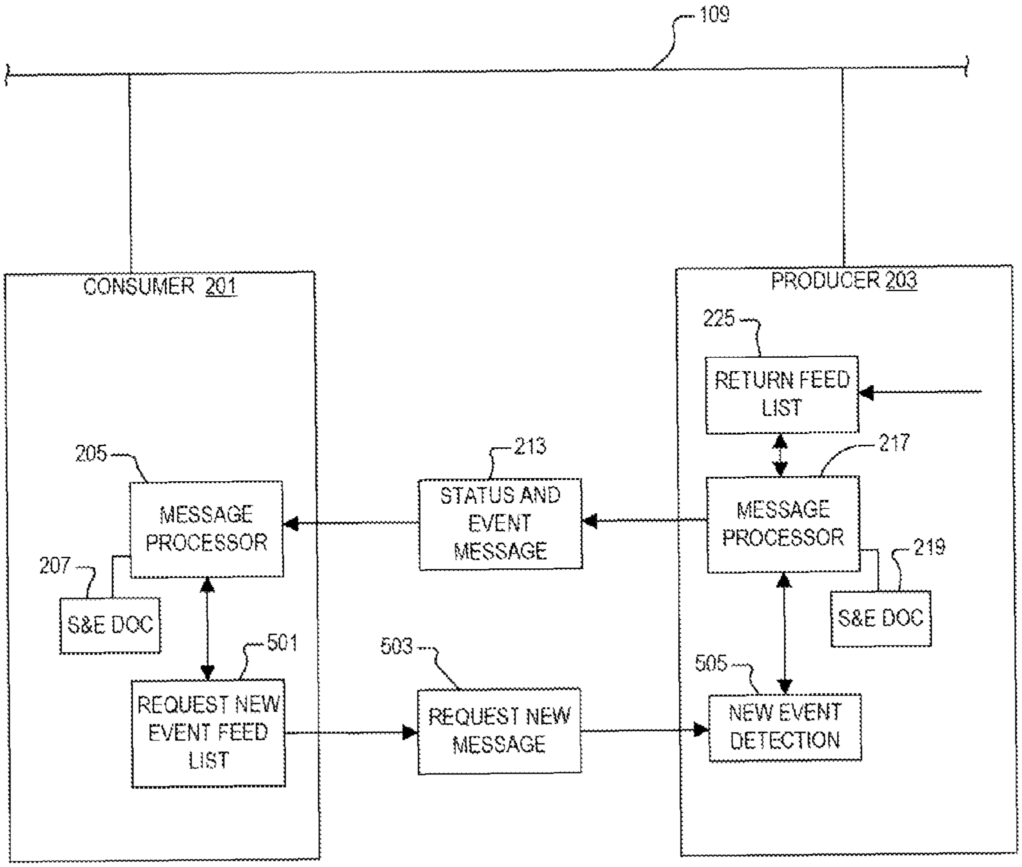
FIG. 5 is a simplified block diagram illustrating configurations and operations of the consumer logic and the producer logic of FIG. 2 according to another exemplary embodiment.

FIG. 5 is a simplified block diagram illustrating configurations and operations of the consumer logic 201 and the producer logic 203 according to another exemplary embodiment. Only applicable portions of the consumer logic 201 and the producer logic 203 are shown for purposes of clarity. The consumer logic 201 is configured in a similar manner as previously described except that it further includes request new event feed list logic 501 coupled to the message processor 205. In this case, the message processor 205 instructs the request new event feed list logic 501 to request new events since a prior request or the like. When activated by the message processor 205, the request new event feed list logic 501 sends a request new message 503 to the producer logic 203. In this case the producer logic 203 includes new event detection logic 505 coupled to the message processor 217. The new event detection logic 505 operates in a similar manner as the tickle logic 235 in which it monitors the message processor 217 for any new events. When any new events occur, the new event detection logic 505 instructs the message processor 217 to respond with a corresponding status and event message 213 incorporating only the new status and event information. The status and event message 213 is received and processed by the message processor 205 in the substantially the same manner as previously described. In this case, the request new message 503 causes the producer logic 203 to respond with the status and event message 213 in the event of new information rather than sending a tickle information message 237 including information about the new status or event information. In one embodiment, the new event detection logic 505 is configurable to cause the message processor 217 to respond only in the event of new information, to respond after a predetermined period of time regardless of whether any new information is available, or to respond after a configurable time period regardless of whether any new information is available, or any combination of these methods.

In one embodiment, the status and event documents 207 and 219 and/or the messages transmitted between consumer devices and producer devices, such as the messages 211, 213, 233, 237, RM1-RM3, SEM1-SEM3, 503, etc., are configured according to a commonly accepted message syndication protocol, such as the Extensible Markup Language (XML) or the HyperText Markup Language (HTML) or the like. In one embodiment, the documents and/or messages are implemented according to the Really Simple Syndication (RSS) protocol or according to any other suitable type of syntax for a syndicated feed. In an alternative embodiment, the documents and/or messages are configured according to the Atom Syndication Format employing the XML language for information feeds, or the Atom Publishing Protocol (APP), which is a simple HTTP-based protocol for creating and updating web-based resources. As known to those skilled in the art, the RSS and Atom protocols are well-known for use to access web content, such as for blogs (web logs), podcasts, video blogs (vlogs), etc.

The use of RSS or Atom or any other open standard web feed data format for communicating status and event information in the physical access control system 100 provides many advantages and benefits as compared to conventional standards and protocols used in conventional physical access control systems. RSS is a polling type of protocol in which the consumer logic polls one or more producers within the system for status and event information. In this manner, the management console 111 or any other device may be coupled anywhere in the system and used to access or produce status or event information at any time. The consumer logic 201 is easily programmed to "subscribe" to any producer device including the producer logic 203 or 301 in the physical access control system 100. RSS feeds, when used for newscasts or blogs or the like, typically have a relatively low poll rate, such as once every few minutes or hours or once a day. In the physical access control system 100, the poll rate is increased to any suitable or desired rate, such as every few seconds, every one second or every sub-second interval to maintain updated information.

The content of RSS messages are generally relatively simple and designed using simple text generally suitable for human consumption. The consumer logic and the producer logic are easily implemented or otherwise written in the system based on well-known open standards. In this manner, rather than having to provide a sophisticated management console with complicated and proprietary communication software, a relatively simple modification of any type of controller, server or console enables simple yet powerful status and event reporting within the physical access control system 100. As described further below, the use of a commonly accepted message syndication protocol provides a significant benefit of facilitating integration, such as combining or linking two more physical access control systems together, adding new components to an existing system, modifying an existing system infrastructure, etc.

The illustrated embodiments also show extensions to RSS or the like without violating the basic syntax of RSS or the like. One extension is the tickle process using a separate tickle channel in which the tickle message 433 is sent by the trigger logic 231, which causes the tickle logic 235 to send the tickle information message 237 after a predetermined or configurable period of time and/or in response to detection of new status and event information, thereby provoking a new 'asynchronous' poll by the retrieve event feed logic 209. Another extension is the request new message process in which new information is detected (e.g., by new event detection logic 505 or the like) and communicated after a predetermined or configurable period of time and/or in response to detection of new status and event information. Another extension is the additional arguments or values or parameters or switches or the like to identify particular information requested or to otherwise limit the amount of information incorporated, such as the UPDATE SINCE value 227 incorporated into the request message 211. As previously described, the UPDATE SINCE value 227 may be used with corresponding parameters (e.g., time stamp, sequence number, etc.) to filter or otherwise limit the amount of information provided in the response message. The event type value 239 is used in a similar manner to limit the information monitored and the information returned, such as higher priority alarms and the like. Another extension is illustrated by the session tracker logic 305 which employs a session cache or the like in which the producer logic 301 tracks the information that has been given to each of one or more consumer logic 201 of consumer devices. Another extension is the rate of polling, which is increased to a relatively high rate.

Figures 6, 12:
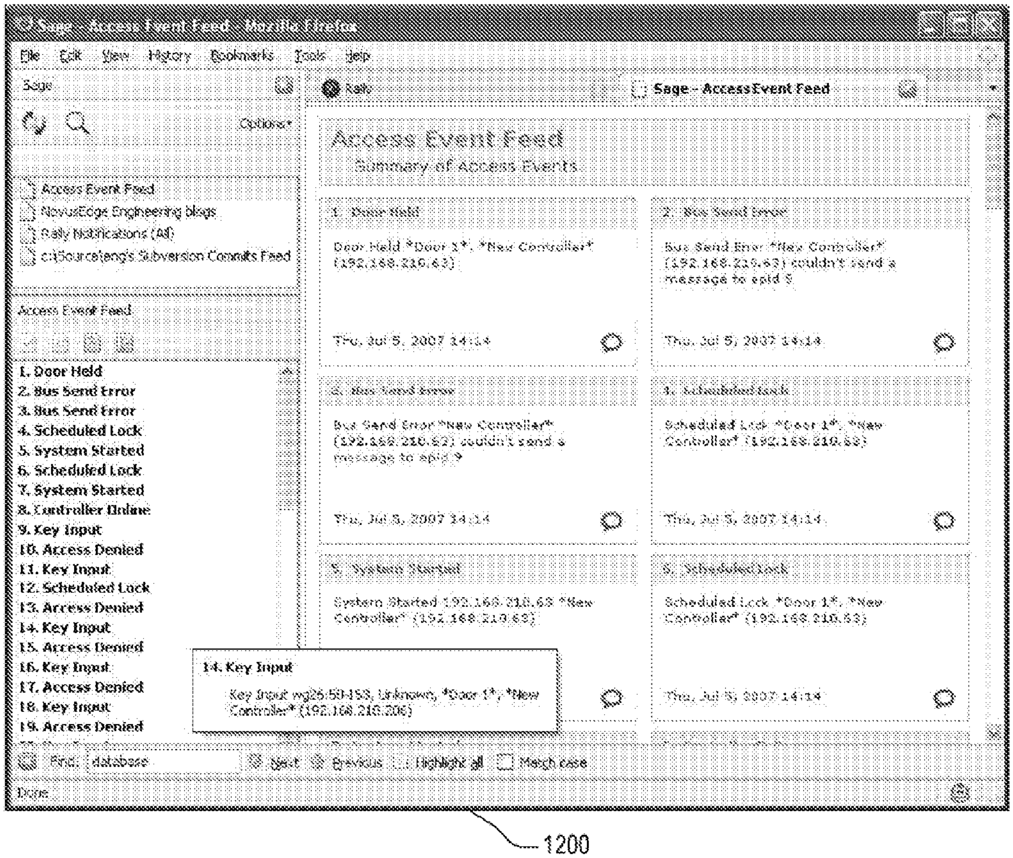
FIG. 6 is a table illustrating exemplary query parameters accepted by RSS protocol feeds according to one embodiment.
FIG. 12 is an exemplary screen shot in RSS reader "Sage" using Mozilla Firefox displaying a summary of access events.
Figure 8:
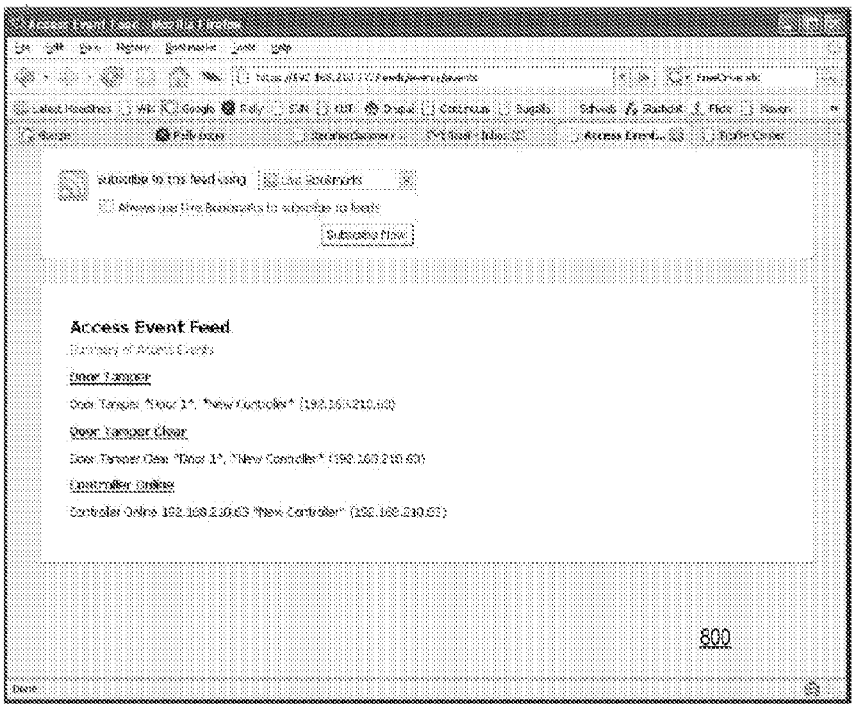
FIGS. 8 and 10 are exemplary screen shots of web pages using standard browsers (Firefox, Internet Explorer) illustrating display of status and event information (shown as a summary of access events) retrieved by the management console of FIG. 1.
Figure 9:
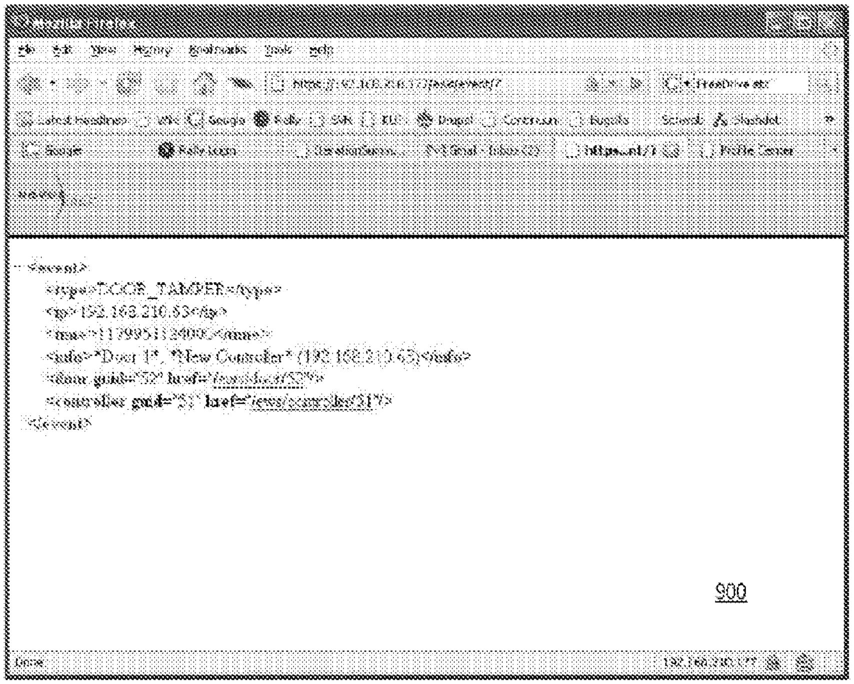
FIGS. 9 and 11 are exemplary screen shots illustrating drill down from the RSS feed which links directly to a REST Web Service API.
Figure 10:
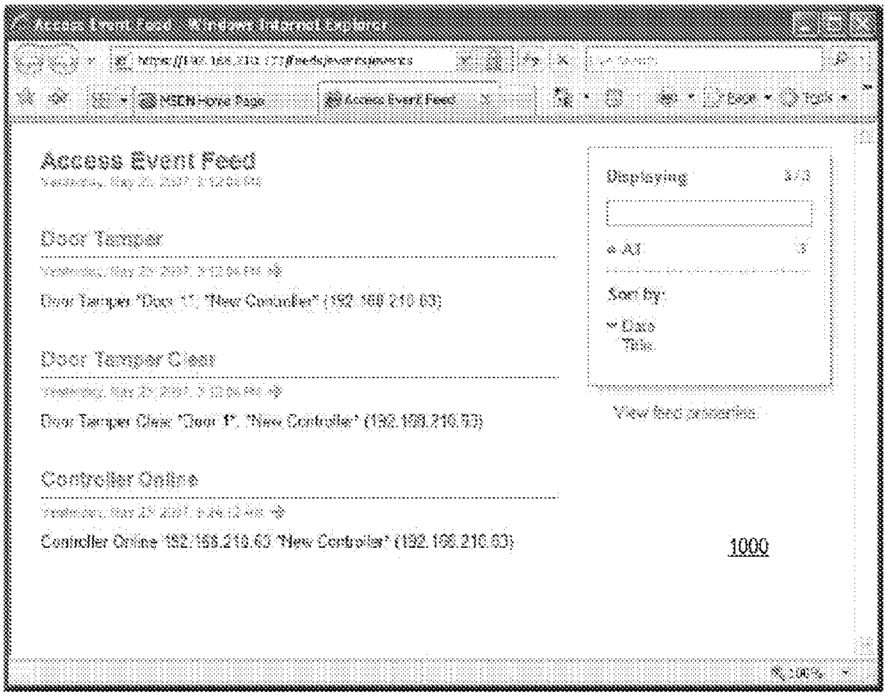
Figure 11:
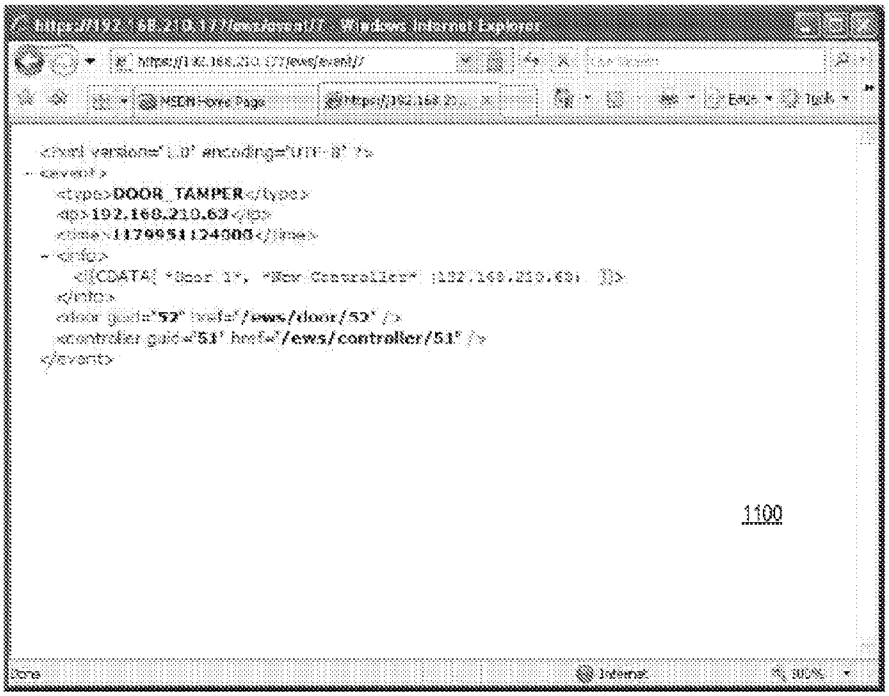

FIG. 6 is a table 600 illustrating exemplary query parameters accepted by RSS protocol feeds according to one embodiment. FIG. 7 is a sample RSS XML document 700 including general RSS information and custom access categories for access control specific content. FIG. 8 is an exemplary screen shot 800 of a web page using the Mozilla Firefox browser illustrating display of status and event information (shown as a summary of access events) retrieved by the management console 111. FIG. 9 is an exemplary screen shot 900 illustrating drill down from the RSS feed which links directly to a REST (Representational State Transfer) Web Service API (Application Programming Interface). In this illustration, the management console 111 is configured as a computer system executing a standard web browser application for retrieving and displaying status and event information. FIGS. 10 and 11 are exemplary screen shots 1000 and 1100, substantially similar to the screen shots 800 and 900, respectively, except using Internet Explorer (IE) web browser by Microsoft®. FIG. 12 is an exemplary screen shot 1200 in RSS reader "Sage" using Mozilla Firefox displaying a summary of access events.

Figure 13:
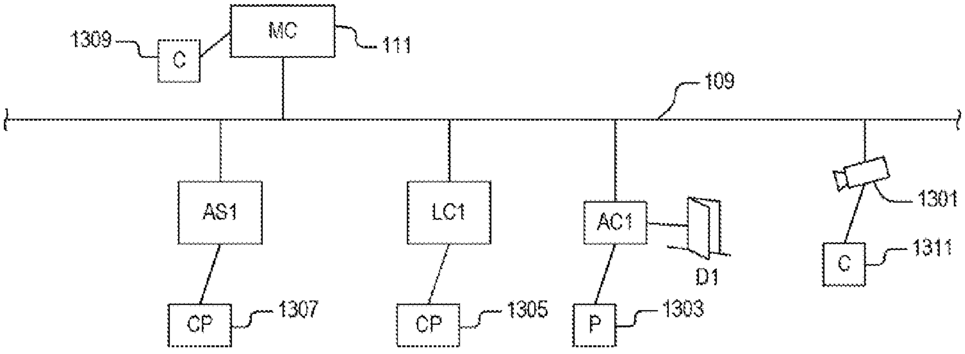
FIG. 13 is a block diagram of a portion of the physical access control system of FIG. 1 further integrating a network video recorder according to one embodiment to illustrate improved integration.

FIG. 13 is a block diagram of a portion of the physical access control system 100 further integrating a network video recorder (NVR) 1301 according to one embodiment to illustrate improved integration. The access controller AC1, the local controller LC1, the access server AS1 and the management console 111 are shown coupled to the network 109 and operate in the same manner as previously described. The NVR 1301 is added to the physical access control system 100 and coupled to the network 111 and focused on the door D1 and the local area surrounding the door D1. The NVR 1301 is provided to record and store video and/or audio information in close proximity of the door D1 to facilitate further information gathering in the event of an alarm or the like. As an example, a typical NVR application constantly records and stores information for a predetermined window of time (e.g., several days, a week, etc.) and when a particular storage capacity is met, new recorded information is stored over old or obsolete information. Certain information may be tagged for a longer or indefinite storage period or for easier retrieval. As an example, the recorded information contemporaneous with an alarm (e.g., door forced, door held, device tamper, etc.) may be tagged for longer or permanent storage to retrieve visual and/or audio information associated with the alarm, such as, for example, visual identification of unauthorized person entering a restricted area.

In a conventional physical access control system, the addition of an NVR or other system components would require that the underlying physical access control system be modified to accommodate communications to or from the new component. As an example, the access server AS1 and other devices would otherwise have to be modified or otherwise reconfigured to "push" status and event to the newly installed NVR. Furthermore, the NVR, or any other device newly installed, would have to be compatible with the underlying system, which was typically proprietary to certain physical access control system vendors, providers, or manufacturers.

In contrast, the physical access control system 100 according to various embodiments does not need further modification for integrating the NVR 1301, since the syntax and protocol associated with message communication is according to a commonly accepted message syndication protocol which is "vendor-neutral". As previously described, each of the components in the physical access control system 100 includes any combination of consumer or provider logic, such as the consumer logic 201 and the provider logic 203. As shown, for example, the access controller AC1 includes or otherwise interfaces at least producer (P) logic 1303 for gathering and producing status and event information associated with the door D1. The local controller LC1 includes or otherwise interfaces consumer and producer (CP) logic 1305 for retrieving status and event information from the access controller AC1 and for providing the status and event information to any other consumer device in the system, such as the access server AC1 and/or the management controller 111. The access server AS1 also includes or otherwise interfaces consumer and producer logic 1307 for retrieving status and event information from the local controller LC1 (and possibly other producer devices) and for providing aggregated status and event information to any other consumer device in the system, such as the management controller 111. The management controller 111 includes or otherwise interfaces consumer (C) logic 1309 for retrieving status and event information from any producer device in the physical access control system 100 as previously described.

As shown, the NVR 1301 includes or is otherwise interfaced with consumer logic 1311, which is similar to the consumer logic 201 previously described. The consumer logic 1311 enables the NVR 1301 to be subscribed to any relevant status and event information in the physical access control system 100, such as, for example, the status and event information from the access controller AC1 and associated with the door D1.

In one embodiment, the consumer logic 1311 of the NVR 1301 periodically polls the producer and consumer logic 1303 of the access controller AC1. In the event of an alarm associated with the door D1, the NVR 1301 receives the alarm event(s) and tags contemporaneous recorded information in the same manner as previously described. It is appreciated that the consumer logic 1311 of the NVR 1301 may further be subscribed to poll for status and event information from other consumer and producer devices aggregating status and event information associated with the door D1 in the event the access controller AC1 is unavailable or damaged or destroyed (such as in the event of a security breach associated with the door D1), such as, for example, the local controller LC1 and/or the access server AS1. It is further appreciated that the consumer logic 1311 of the NVR 1301 may employ the tickle method and/or request new event feed methods previously described if desired. It is appreciated that the physical access control system 100 requires no modification to add the NVR 1301, other than a possible extension of the network 109 to access the NVR 1301. It is further appreciated that any modification of the NVR 1301 to incorporate the consumer logic 1311 for detecting relevant status and alarm information is relatively simple and achievable without requiring proprietary equipment or special knowledge or expertise.

A physical access control system according to one embodiment includes a network, at least one access controller, a producer device and a consumer device. Each access controller generates status and event information associated with at least one controlled physical barrier. The producer device includes producer logic which collects and stores the status and event information via the network. The consumer device includes consumer logic which periodically polls the producer logic via the network to retrieve the status and event information from the producer device. The producer logic and the consumer logic communicate via the network according to a commonly accepted message syndication protocol.

In one embodiment, the commonly accepted message syndication protocol is the really simple syndication (RSS) protocol. In another embodiment, the commonly accepted message syndication protocol is the Atom Publishing Protocol. In one embodiment, the status and event information is communicated as an extensible markup language (XML) document.

In various embodiments, the consumer logic periodically sends a request message via the network to poll the producer logic, and the producer logic responds via the network with a status and event message incorporating the status and event information. The status and event information may include temporal information, where the consumer logic inserts a temporal parameter into the request message to identify and retrieve updated information.

The producer logic may include a message processor and trickle logic. The message processor aggregates the status and event information into a status and event document. The tickle logic detects new information added to the status and event document and sends via the network a tickle information message to the consumer logic in response. The consumer logic may respond to the tickle information message by sending a request message via the network to poll the producer logic for the new information. The consumer logic may further include trigger logic which sends a tickle message via the network to the producer logic to activate the tickle logic. The status and event information may include different event types, where the trigger logic may incorporate an event type value into the tickle message to identify at least one of the event types for the tickle logic to monitor.

The producer logic may include a message processor and return feed list logic. The message processor aggregates the status and event information. The return feed list logic receives a request message from the consumer logic and instructs the message processor to respond with a status and event message via the network incorporating the status and event information. The return feed list logic may include session tracker logic which tracks communication sessions and corresponding consumer devices sending request messages. The return feed list logic instructs the message processor to send complete status and event information via the network to a consumer device during a new session and instructs the message processor to send via the network updated status and event information to a consumer device during an existing session.

The consumer logic may include a consumer message processor which aggregates the status and event information and request new event feed list logic which sends via the network a request new message to the producer logic for requesting new information. The producer logic may include a producer message processor, return feed list logic, and new event detection logic. The producer message processor aggregates the status and event information. The return feed list logic instructs the message processor to send status and event messages via the network incorporating the status and event information to the consumer logic. The new event detection logic receives the request new message, monitors the producer message processor for the new information, and instructs the return feed list logic to cause a status and event message to be sent via the network from the producer message processor incorporating the new information.

Consumer logic is disclosed which is configured for coupling to a communication network of a physical access control system, where the system includes a controlled physical barrier. In one embodiment, the consumer logic includes retrieve logic and processor logic. The retrieve logic periodically sends a request message via the communication network to request status and event information associated with the controlled physical barrier. The processor logic receives a status and event message sent via the communication network incorporating the status and event information. The retrieve logic and the processor logic communicate via the communication network according to a commonly accepted message syndication protocol, such as the RSS protocol or the Atom Publishing Protocol or the like. The consumer logic may include polling logic configurable to establish a polling time period for sending the request message.

The status and event information may include temporal information, where the retrieve logic inserts a temporal parameter into the request message to request updated status and event information. The processor logic may receive a temporal value from the status and event message used to determine the temporal parameter.

The consumer logic may include trigger logic which sends a tickle request message via the communication network for requesting updated status and event information, and which informs the processor logic that the updated status and event information is available upon receipt of a tickle information message received via the communication network. The status and event information may include temporal information, where the retrieve logic inserts a temporal parameter into the request message to request the updated status and event information.

The consumer logic may include request logic which sends a request new message via the communication network to request updated status and event information. The consumer logic may include producer logic which sends the status and event information via the communication network in response to a request message received via the communication network.

Producer logic is disclosed which is configured for coupling to a communication network of a physical access control system which includes a controlled physical barrier. In one embodiment, the producer logic includes a document, return logic, and processor logic. The document stores status and event information associated with the controlled physical barrier. The return logic receives a request message via the communication network to request the status and event information. The processor logic sends a status and event message via the communication network incorporating the status and event information in response to the request message. The return logic and the processor logic communicate via the communication network according to a commonly accepted message syndication protocol, such as RSS or Atom Publishing Protocol or the like.

The status and event information may include temporal information, where the return logic detects a temporal parameter within the request message and instructs the processor logic to filter the status and event information based on the temporal parameter. The producer logic may include tickle logic which receives a tickle request message via the communication network for requesting updated status and event information, which monitors the processor logic, and which sends a tickle information message via the communication network when the updated status and event information is available. The tickle logic may insert differential information into the tickle information message providing information about the updated status and event information.

The producer logic may include new event detection logic which receives a request new message via the communication network, which monitors the processor logic for updated status and event information, and which instructs the processor logic to send the status and event message incorporating the updated status and event information. The producer logic may include monitor and detection logic which senses the status and event information of the controlled physical barrier. The producer logic may include consumer logic which periodically requests the status and event information via the communication network Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

What is claimed is:

1. A physical access control system, comprising:

a network;

at least one access controller coupled to said network, each said access controller generating status and event information associated with at least one controlled physical barrier;

a producer device, coupled to said network, including producer logic which collects and stores said status and event information;

a consumer device, coupled to said network, including consumer logic which periodically polls said producer logic via said network to retrieve said status and event information from said producer device;

wherein said producer logic and said consumer logic communicate via said network according to a commonly accepted message syndication protocol; and wherein said producer logic comprises:

a message processor which aggregates said status and event information into a status and event document; and tickle logic, coupled to said message processor, which detects new information added to said status and event document and which sends a tickle information message via said network to said consumer logic in response.

2. The physical access control system of claim 1, wherein said commonly accepted message syndication protocol comprises the really simple syndication (RSS) protocol.

3. The physical access control system of claim 1, wherein said commonly accepted message syndication protocol comprises the Atom Publishing Protocol.

4. The physical access control system of claim 1, wherein said status and event information is communicated as an extensible markup language (XML) document.

5. The physical access control system of claim 1, wherein said consumer logic periodically sends a request message via said network to poll said producer logic, and wherein said producer logic responds via said network with a status and event message incorporating said status and event information.

6. The physical access control system of claim 5, wherein said status and event information comprises temporal information, and wherein said consumer logic inserts a temporal parameter into said request message to identify and retrieve updated information.

7. The physical access control system of claim 1, wherein said consumer logic responds to said tickle information message by sending a request message via said network to poll said producer logic for said new information.

8. The physical access control system of claim 1, wherein said consumer logic comprise trigger logic which sends a tickle message via said network to said producer logic to activate said tickle logic.

9. The physical access control system of claim 8, wherein said status and event information comprises a plurality of different event types, and wherein said trigger logic incorporates an event type value into said tickle message to identify at least one of said plurality of event types for said tickle logic to monitor.

10. A physical access control system, comprising:

a network;

at least one access controller coupled to said network, each said access controller generating status and event information associated with at least one controlled physical barrier;

a producer device, coupled to said network, including producer logic which collects and stores said status and event information;

a consumer device, coupled to said network, including consumer logic which periodically polls said producer logic via said network to retrieve said status and event information from said producer device;

wherein said producer logic and said consumer logic communicate via said network according to a commonly accepted message syndication protocol; and wherein said producer logic comprises:

a message processor which aggregates said status and event information; and return feed list logic, coupled to said message processor, which receives a request message from said consumer logic and which instructs said message processor to respond with a status and event message via said network incorporating said status and event information.

11. The physical access control system of claim 10, wherein said return feed list logic comprises session tracker logic which tracks communication sessions and corresponding consumer devices sending request messages, and wherein said return feed list logic instructs said message processor to send complete status and event information via said network to a consumer device during a new session and instructs said message processor to send updated status and event information via said network to a consumer device during an existing session.

12. A physical access control system, comprising:

a network;

at least one access controller coupled to said network, each said access controller generating status and event information associated with at least one controlled physical barrier;

a producer device, coupled to said network, including producer logic which collects and stores said status and event information;

a consumer device, coupled to said network, including consumer logic which periodically polls said producer logic via said network to retrieve said status and event information from said producer device;

wherein said producer logic and said consumer logic communicate via said network according to a commonly accepted message syndication protocol;

wherein said consumer logic comprises:

a consumer message processor which aggregates said status and event information; and request new event feed list logic, coupled to said consumer message processor, which sends a request new message via said network to said producer logic for requesting new information; and wherein said producer logic comprises:

a producer message processor which aggregates said status and event information;

return feed list logic, coupled to said producer message processor, which instructs said message processor to send status and event messages via said network incorporating said status and event information to said consumer logic; and new event detection logic, coupled to said producer message processor and said return feed list logic, which receives said request new message, which monitors said producer message processor for said new information, and which instructs said return feed list logic to cause a status and event message to be sent via said network from said producer message processor incorporating said new information.

13. Consumer logic for coupling to a communication network of a physical access control system, wherein the physical access control system comprises a controlled physical barrier, wherein the consumer logic comprises:

retrieve logic which periodically sends a request message via the communication network to request status and event information associated with the controlled physical barrier;

processor logic, coupled to said retrieve logic, which receives a status and event message sent via the communication network incorporating said status and event information;

wherein said retrieve logic and said processor logic communicate via said communication network according to a commonly accepted message syndication protocol; and trigger logic, coupled to said processor logic, which sends a tickle request message via the communication network for requesting updated status and event information, and which informs said processor logic that said updated status and event information is available upon receipt of a tickle information message received via the communication network.

14. The consumer logic of claim 13, wherein said commonly accepted message syndication protocol comprises the really simple syndication (RSS) protocol.

15. The consumer logic of claim 13, wherein said commonly accepted message syndication protocol comprises the Atom Publishing Protocol.

16. The consumer logic of claim 13, further comprising polling logic, coupled to said retrieve logic, wherein said polling logic is configurable to establish a polling time period for sending said request message.

17. The consumer logic of claim 13, the status and event information comprising temporal information, wherein said retrieve logic inserts a temporal parameter into said request message to request updated status and event information.

18. The consumer logic of claim 17, wherein said processor logic receives a temporal value from said status and event message used to determine said temporal parameter.

19. The consumer logic of claim 13, the status and event information comprising temporal information, wherein said retrieve logic inserts a temporal parameter into said request message to request said updated status and event information.

20. The consumer logic of claim 13, further comprising request logic, coupled to said processor logic, which sends a request new message via the communication network to request updated status and event information.

21. The consumer logic of claim 13, further comprising producer logic, coupled to said processor logic, which sends said status and event information via the communication network in response to a request message received via the communication network.

22. Producer logic for coupling to a communication network of a physical access control system, wherein the physical access control system comprises a controlled physical barrier, wherein the producer logic comprises:

a document storing status and event information associated with the controlled physical barrier;

return logic which receives a request message via the communication network to request said status and event information;

processor logic, coupled to said return logic and said document, which sends a status and event message via the communication network incorporating said status and event information in response to said request message;

wherein said return logic and said processor logic communicate via the communication network according to a commonly accepted message syndication protocol; and tickle logic, coupled to said processor logic, which receives a tickle request message via the communication network for requesting updated status and event information, which monitors said processor logic, and which sends a tickle information message via the communication network when said updated status and event information is available.

23. The producer logic of claim 22, wherein said commonly accepted message syndication protocol comprises the really simple syndication (RSS) protocol.

24. The producer logic of claim 22, wherein said commonly accepted message syndication protocol comprises the Atom Publishing Protocol.

25. The producer logic of claim 22, said status and event information comprising temporal information, wherein said return logic detects a temporal parameter within said request message and instructs said processor logic to filter said status and event information based on said temporal parameter.

26. The producer logic of claim 22, wherein said tickle logic inserts differential information into said tickle information message providing information about said updated status and event information.

27. The producer logic of claim 22, further comprising monitor and detection logic which senses said status and event information of the controlled physical barrier.

28. The producer logic of claim 22, further comprising consumer logic, coupled to said processor logic, which periodically requests said status and event information via the communication network.

29. Producer logic for coupling to a communication network of a physical access control system, wherein the physical access control system comprises a controlled physical barrier, wherein the producer logic comprises:

a document storing status and event information associated with the controlled physical barrier;

return logic which receives a request message via the communication network to request said status and event information;

processor logic, coupled to said return logic and said document which sends a status and event message via the communication network incorporating said status and event information in response to said request message;

wherein said return logic and said processor logic communicate via the communication network according to a commonly accepted message syndication protocol; and new event detection logic, coupled to said processor logic, which receives a request new message via the communication network, which monitors said processor logic for updated status and event information, and which instructs said processor logic to send said status and event message incorporating said updated status and event information.

* * * * *